United States Patent
Johnston et al.

(10) Patent No.: US 10,701,096 B1
(45) Date of Patent: Jun. 30, 2020

(54) SYSTEMS AND METHODS FOR ANOMALY DETECTION ON CORE BANKING SYSTEMS

(71) Applicant: Adlumin, Inc., Washington, DC (US)

(72) Inventors: Robert Seth Johnston, Arlington, VA (US); Timothy Stacey, Arlington, VA (US); Daniel McQuade, Arlington, VA (US); Milind Gangwani, Arlington, VA (US)

(73) Assignee: Adlumin, Inc., Washington, DC (US)

( * ) Notice: Subject to any disclaimer, the term of this patent is extended or adjusted under 35 U.S.C. 154(b) by 0 days.

(21) Appl. No.: 16/667,359

(22) Filed: Oct. 29, 2019

Related U.S. Application Data (60) Provisional application No. 62/903,947, filed on Sep. 23, 2019.

(51) Int. Cl.
*H04L 29/06* (2006.01)
*G06Q 40/02* (2012.01)
*G06Q 10/00* (2012.01)

(52) U.S. Cl.
CPC .......... *H04L 63/1425* (2013.01); *G06Q 10/20* (2013.01); *G06Q 40/02* (2013.01); *H04L 63/1408* (2013.01); *H04L 63/1416* (2013.01)

(58) Field of Classification Search
CPC ............. H04L 63/1408; H04L 63/1416; H04L 63/1425; H04L 63/1433; G06Q 10/20; G06Q 40/02
See application file for complete search history.

(56) References Cited

U.S. PATENT DOCUMENTS

| | | | | |
|---|---|---|---|---|
| 7,159,237 B2* | 1/2007 | Schneier | ............... | G06F 21/552 709/223 |
| 7,650,638 B1* | 1/2010 | Njemanze | ........... | H04L 63/1408 713/170 |
| 8,069,230 B2* | 11/2011 | Lancaster | ........... | H04L 41/0803 709/220 |
| 8,104,087 B2* | 1/2012 | Quinn | ................. | G06F 11/0748 726/22 |
| 8,291,258 B2* | 10/2012 | Narayanaswamy | ........................ | H04L 63/1408 709/224 |
| 9,021,583 B2* | 4/2015 | Wittenstein | ........... | G06F 21/554 726/22 |
| 9,729,416 B1* | 8/2017 | Khanal | ............... | H04L 43/0823 |
| 9,813,432 B2* | 11/2017 | Dasgupta | ............ | H04L 63/1416 |

(Continued)

*Primary Examiner* — Linglan E Edwards
(74) *Attorney, Agent, or Firm* — Barcelo, Harrison & Walker LLP

(57) ABSTRACT

In certain embodiments, three or more sensors may be installed on a core banking system to detect anomalous behavior. Each of the sensors may be configured to detect removal or corruption of any of the other sensors at a periodic interval and to repair or reinstall any of the other sensors that has been corrupted or removed so that the combination of the sensors makes the group of sensors unremovable. A sensor may be configured to detect anomalous behavior by applying an anomaly detection model developed using live data collected by the sensor. In certain embodiments, a new anomaly detection model may be developed and trained to recognize potentially anomalous events; tested; and used to generate a live score to indicate the likelihood that a detected event is an anomaly. A model may be used for scoring in as little as 6 hours after initial receipt of live data.

29 Claims, 4 Drawing Sheets

(56) References Cited

U.S. PATENT DOCUMENTS

| | | | |
|---|---|---|---|
| 2007/0192400 A1* | 8/2007 | Lee | G06F 11/0709 |
| | | | 709/202 |
| 2015/0341376 A1* | 11/2015 | Nandy | H04L 63/1408 |
| | | | 726/23 |
| 2018/0052907 A1* | 2/2018 | Greifeneder | G06F 16/285 |

* cited by examiner

SYSTEMS AND METHODS FOR ANOMALY DETECTION ON CORE BANKING SYSTEMS

I. CROSS-REFERENCE TO RELATED APPLICATIONS

This application claims priority of U.S. Patent Application No. 62/903,947, entitled "Systems and methods for anomaly detection on core banking systems," and filed Sep. 23, 2019. The entirety of the foregoing patent application is incorporated by reference herein to the extent consistent with the present disclosure.

II. TECHNICAL FIELD

The present disclosure relates to systems and methods for anomaly detection and more particularly to systems and methods for anomaly detection on core banking systems.

III. BACKGROUND OF THE INVENTION

Core banking systems protect high-value data that is at constant risk of cyber attack. There is a need for early detection of anomalies on core banking system to prevent compromise of valuable data and systems. Current anomaly detection systems and methods are at risk of removal from the systems they are designed to protect by cyber attackers. Conventional anomaly detection models typically require considerable configuration and large quantities of historical data to develop and test the anomaly detection models.

There is a need to address the foregoing deficiencies in the art.

V. DETAILED DESCRIPTION

In certain embodiments, an anomaly detection device for core banking systems is disclosed, comprising: a first sensor for detecting anomalous behavior on a core banking system; a second sensor for verifying that the first sensor remains active; a third sensor for detecting removal or corruption of the first sensor or the second sensor; and wherein each of the first sensor, the second sensor and the third sensor are configured to detect removal or corruption of either of the other two sensors at a periodic interval and to repair any of the other two sensors that has been corrupted or to reinstall any of the other sensors that have been removed. The first sensor may be configured to detect anomalous behavior by applying an anomaly detection model developed using first live data collected by the first sensor; wherein the anomaly detection model is configured to compare the first live data to a plurality of existing anomaly detection models; and if an existing anomaly detection model is applicable to the first live data, update the existing model to incorporate the first live data; or if an existing anomaly detection model is not applicable to the first live data, generate a new anomaly detection model of a first event in the first live data; train the new anomaly detection model to recognize the first event in the first data; test the new anomaly detection model against second live data; and generate a live score of the first live data to indicate the likelihood that the first event is an anomaly; storing the new model with the plurality of existing models. The anomaly detection model may apply time differential analysis to determine which of the first live data to compare to the existing anomaly detection models. The time differential analysis may be performed by monitoring one or more event logs, process logs and file watcher logs for change over a monitored interval to identify one or more changed logs and comparing the changed logs to the existing anomaly detection models. The one or more changed logs may have changed in at least one of a size of a file, a number of lines of a file or a byte count of a file snapshot over the monitored interval. The live score may comprise: a first live score based on the frequency that the first event occurred during testing of the new anomaly detection model; and a second live score based on an assessment of token similarity between the first live event and the existing anomaly detection model or the new anomaly detection model; wherein the live score comprises a probability that the first event is anomalous based on the first live score and the second live score. The first live data may comprise a first moving live data and a first static live data; and wherein the live score is generated by comparing the first static live data to an event template in the existing anomaly detection model or the new anomaly detection model. The first live data may be collected via a decision guide that comprises one or more data collection methods starting with a least resource intensive collection method and if the first live data needed by the anomaly detection model is not obtained by the least resource intensive collection method, may direct the performance of progressively more resource intensive collection methods until the first live data needed by the anomaly detection model is collected. The first live data may comprise stitched together data from a plurality of data sources to allow the anomaly detection model to detect inconsistencies in the first live data collected from different data sources. The stitched together data may comprise event data wherein the user data may be labeled as third party data. The stitched together data may be produced by revalidating a UserID and an IP address outside of a system capture log.

In certain embodiments, an anomaly detection device for core banking systems is disclosed, comprising: a first sensor for detecting anomalous behavior on a core banking system; a second sensor for verifying that the first sensor remains active; a third sensor for detecting removal or corruption of the first sensor or the second sensor; and wherein each of the first sensor, the second sensor and the third sensor are configured to detect removal or corruption of either of the other two sensors at a periodic interval and to repair any of the other two sensors that has been corrupted or to reinstall any of the other sensors that have been removed. The first sensor may be configured to detect anomalous behavior by: collecting identifying information and first live data; generating a first live data template from the first live data; transmitting the first live data template to a data engineering engine configured to apply an anomaly detection model developed using live data to first live data collected by the first sensor; wherein the anomaly detection model is configured to: compare the first live data template to a plurality of existing anomaly detection models; and if an existing anomaly detection model is applicable to the first live data template, update the existing model to incorporate the first live data template; or if an existing anomaly detection model is not applicable to the first live data template, generate a new anomaly detection model of a first event in the first live data template; train the new anomaly detection model to recognize the first event in the first live data template; test the new anomaly detection model against second live data; and generate a live score of the first live data template to indicate the likelihood that the first event is an anomaly; storing the new model with the plurality of existing models; receiving the first live score at the first sensor. If the first live data template does not match any of the existing anomaly detection models, the anomaly detection module may be further configured to: remove at least one rapidly changing field from the first live data template to generate a set of tokens; and compare the set of tokens to the existing anomaly detection models; and if the set of tokens matches an existing anomaly detection model, generate a live score of the first live data to indicate the likelihood that the first event is an anomaly. The anomaly detection model may apply time differential analysis to determine which of the first live data to compare to the existing anomaly detection models. The time differential analysis may be performed by monitoring one or more event logs, process logs and file watcher logs for change over a monitored interval to identify one or more changed logs and comparing the changed logs to the existing anomaly detection models. The one or more changed logs may have changed in at least one of a size of a file, a number of lines of a file or a byte count of a file snapshot over the monitored interval. The live score may comprise: a first live score based on the frequency that the first event occurred during testing of the new anomaly detection model; and a second live score based on an assessment of token similarity between the first live event and the existing anomaly detection model or the new anomaly detection model; wherein the live score comprises a probability that the first event is anomalous based on the first live score and the second live score. The first live data may comprise a first moving live data and a first static live data; and wherein the live score is generated by comparing the first static live data to an event template in the existing anomaly detection model or the new anomaly detection model. The first live data may be collected via a decision guide that comprises one or more data collection methods starting with a least resource intensive collection method and if the first live data needed by the anomaly detection model is not obtained by the least resource intensive collection method, directs the performance of progressively more resource intensive collection methods until the first live data needed by the anomaly detection model is collected. The first live data may be collected via one or more kernel command to minimize use of the first sensor on the core banking system. The first live data may be collected via a decision guide using one or more of the following three steps: executing one or more kernel command to minimize use of the first sensor on the core banking system; and if the one or more kernel command does not return a desired data set: collected the first live data by querying a factory default path for the desired data set or by traversing a system configuration file used by. the core banking system on startup of one or more apps at each run level of the kernel. The first live data may comprise stitched together data from a plurality of log categories comprising event logs, process logs and watcher logs based on a timestamp. The stitched together data may comprise event data wherein the user data may be labeled as third party data. The stitched together data may be produced by revalidating a UserID and an IP address outside of a system capture log.

In certain embodiments, an anomaly detection system for core banking systems is disclosed, comprising: a data engineering engine configured for receiving live data from an endpoint anomaly detection system comprising; a first sensor for detecting anomalous behavior on a core banking system; a second sensor for verifying that the first sensor remains active; a third sensor for detecting removal or corruption of the first sensor or the second sensor; and wherein each of the first sensor, the second sensor and the third sensor are configured to detect removal or corruption of either of the other two sensors at a periodic interval and to repair any of the other two sensors that has been corrupted or to reinstall any of the other sensors that have been removed; applying an anomaly detection model developed using live data to first live data collected by the first sensor; wherein the anomaly detection model is configured to: comparing the first live data to a plurality of existing anomaly detection models; and if an existing anomaly detection model is applicable to the first live data, updating the existing model to incorporate the first live data; or if an existing anomaly detection model is not applicable to the first live data, generating a new anomaly detection model of a first event in the first live data; training the new anomaly detection model to recognize the first event in the first data; testing the new anomaly detection model against second live data; and generating a live score of the first live data to indicate the likelihood that the first event is an anomaly; storing the new model with the plurality of existing models. The live score may comprise: a first live score based on the frequency that the first event occurred during testing of the new anomaly detection model; and a second live score based on an assessment of token similarity between the first live event and the existing anomaly detection model or the new anomaly detection model; wherein the live score comprises a probability that the first event is anomalous based on the first live score and the second live score. The first live data may comprise a first moving live data and a first static live data; and wherein the live score is generated by comparing the first static live data to an event template in the existing anomaly detection model or the new anomaly detection model. The first live data may be collected via one or more kernel command to minimize use of a system memory on the core banking system. The first live data is collected via a decision guide using one or more of the following three steps: executing one or more kernel command to minimize use of the first sensor on the core banking system; and if the one or more kernel command does not return a desired data set: collected the first live data by querying a factory default path for the desired data set or by traversing a configuration file for the desired data set. The first live data may comprise stitched together data from a kernel journal and one or more additional markers from an app auditor. The stitched together data may comprise event data wherein the user data is labeled as third party data. The stitched together data may be produced by revalidating a UserID and an IP address outside of a system capture log.

In certain embodiments, an anomaly detection method for core banking systems is disclosed, comprising: receiving live data from an endpoint anomaly detection system comprising; a first sensor for detecting anomalous behavior on a core banking system; a second sensor for verifying that the first sensor remains active; a third sensor for detecting removal or corruption of the first sensor or the second sensor; and wherein each of the first sensor, the second sensor and the third sensor are configured to detect removal or corruption of either of the other two sensors at a periodic interval and to repair any of the other two sensors that has been corrupted or to reinstall any of the other sensors that have been removed; applying an anomaly detection model developed using first live data collected by the first sensor; comparing the first live data to a plurality of existing anomaly detection models; and if an existing anomaly detection model is applicable to the first live data, updating the existing model to incorporate the first live data; or if an existing anomaly detection model is not applicable to the first live data, generating a new anomaly detection model of a first event in the first live data; training the new anomaly detection model to recognize the first event in the first data; testing the new anomaly detection model against second live data; and generating a live score of the first live data to indicate the likelihood that the first event is an anomaly; storing the new model with the plurality of existing models. The live score may comprises: a first live score based on the frequency that the first event occurred during testing of the new anomaly detection model; and a second live score based on an assessment of token similarity between the first live event and the existing anomaly detection model or the new anomaly detection model; wherein the live score comprises a probability that the first event is anomalous based on the first live score and the second live score. The first live data may comprise a first moving live data and a first static live data; and wherein the live score is generated by comparing the first static live data to an event template in the existing anomaly detection model or the new anomaly detection model. The first live data may be collected via one or more kernel command to minimize use of a system memory on the core banking system. The first live data may be collected via a decision guide using one or more of the following three steps: executing one or more kernel command to minimize use of the first sensor on the core banking system; and if the one or more kernel command does not return a desired data set: may be collected the first live data by querying a factory default path for the desired data set or by traversing a configuration file for the desired data set. The first live data may comprise stitched together data from a kernel journal and one or more additional markers from an app auditor. The stitched together data may comprise event data wherein the user data is labeled as third party data. The stitched together data may be produced by revalidating a UserID and an IP address outside of a system capture log.

Sensor Application

Introduction

In certain embodiments, a sensor application may be a daemon type service, that audits all activities on the devices it's installed on. It may be a Linux or Unix sensor. These collected activities logs may be stitched(associated) with user login session and a parent process that triggered all the other child or grandchild processes. These collected activities logs may be encrypted and uploaded to an analytics station, for further monitoring and analysis.

In certain embodiments, the sensor implementation may be broken down into two major components:

1) Application Installation on the device using OS kernel hooks or sensors
2) Application (itself) that collects all activities and stitches them with Users Session (contain remote IP address or physically logged in) and creates a custom audit log or activities logs of the device.

In certain embodiments, the sensor agent that resides in a client device, Server or any Linux/Unix Machine may use Three (3) "Kernel Hooks" or sensors to ensure the Application is always "Present" "respawn" and run even under the described given circumstance.

1 If any logged in user, (with the highest privilege) tries to "stop" the daemon service.
2. If any logged in user, (with the highest privilege) tries to kill the sensor application using the Task-Manager (using the Application processes ID)
3. If the Sensor Application file is corrupted (by some other cleanup or malware application)
4. If the Sensor Application older is deleted from the system.

In certain embodiments, "Present" may mean registered using "Daemon", "SystemD" or "Initd Service" to the OS Kernel; "Running" may mean all task running on a operating system must have an Operating system assigned Process ID or else they are halted; and "Kernel Hooks" may mean sensors that are securely cinched with the kernel of the operating System. In certain embodiments, even if the User has deleted one or more of the kernel hooks or sensors, the other sensors will detect that condition of the sensor application and restore it to its normal state and re-run the sensor application.

Figure 1:
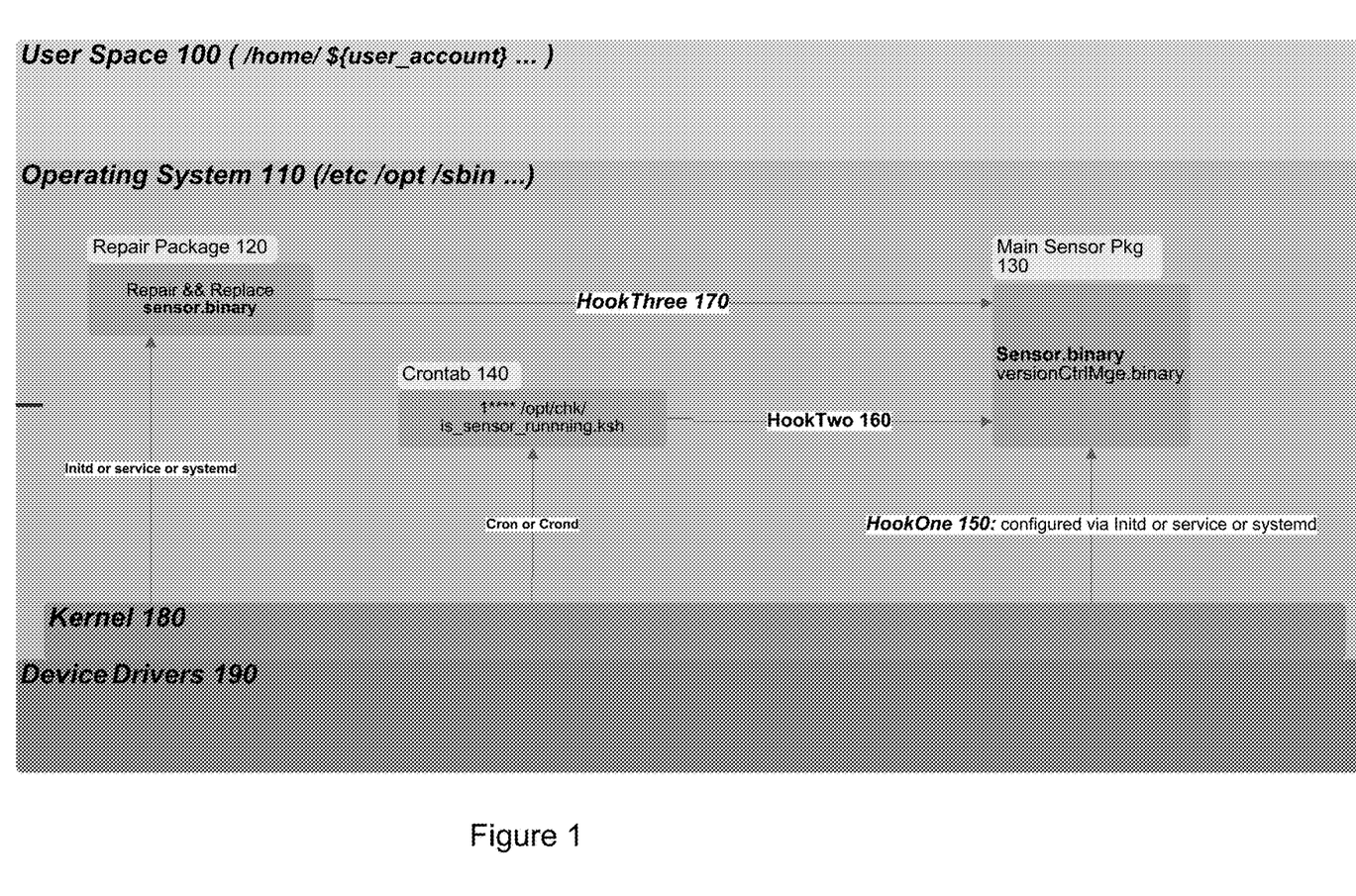
FIG. 1 depicts a core banking system including three sensors for anomaly detection in accordance with certain embodiments.

In certain embodiments as shown in FIG. 1, HookOne 150, HookTwo 160, and HookThree 170 may be three different sensor applications, installed on a client device. The client device may be a core banking system or connected to one or more core banking systems. HookOne 150 may be a first sensor. The client device may include User Space 100, Operating Space 110, Kernel 180 and Device Drivers 190.

In certain embodiments, HookONE 150, HookTWO 160 and HookTHREE 170 may be registered with the Operating System 110 using one of the preferred configurations with the OS specification, which may include but not be limited to "Daemon" or "service" or "Cron" or "SystemD" is accordance with configuration guideline provided by the OS Manufacture and/or distributed company. The combination of the three sensors HookONE 150, HookTWO 160 and HookTHREE 170 may cooperate to ensure that the sensor application, HookOne 150 is always auditing and has not lost track of audit, for example, if it was temporarily disabled for audit by some Admin user.

HookOne 150 may be a first sensor that may be written in C++, Java or Golang or other suitable language that reads OS Data and may include Main Sensor Package 130.

HookTwo 160, may be a second sensor that may check on sensor one/HookOne 150 (Application) using Crontab 140 and restart it if, it was stopped as a service register to the OS or the Processes were killed and are no longer running. The checks may be performed on a periodic interval, which may be for example a 2 min interval.

HookThree 170, may be a third sensor that may repair and replace damaged files of sensor one/HookONE 160 using repair package 120. HookThree 170 may store a backup of HookOne 150 in a different folder as a zip file and if necessary, may unzip and replace the existing HookONE 150.

In a rare case, if HookTHREE 170 zip file is also deleted (removed by another application such as Malware or cleanup) HookThree 170 may download a fresh copy of the Application executable of sensor one via Https and create a zip and also replace the existing HookONE 150 application.

If the application executable file is damaged (for example, if the MD5 and Sh256 value of the sensor one executable is invalid) hook/sensor three 170 may remove and replace the file and may alert an Analytics System that may include an API.

HookTwo 160 and HookThree 170 may run on periodic intervals and may check if HookOne needs repair of any kind.

HookONE 150 may be registered with the Operating System as "Init.D Service" or "SystemD" depending on an Operating System 110 version and when was it last updated (an example would be if the oldest version only supports Init.D and all the latest OS version now includes SystemD).

HookONE 150, also referred to as sensor one, may start on startup and run as a background processes without taking much of the OS resources, (i.e. CPU, cache memory, RAM) and will delay its action if a high priority application is running and the operating system. Sensor one 150 may use Daemon Service that is Kernel manager Low-level threads. which does not block resources.

In certain embodiments, HookONE 150 may check and repair HookTwo 160 and HookThree 170 on a periodic interval. For example and without limitation, the interval may be every two hours. HookOne 150 may be written in Golang and Java or other suitable programming language and may replace files of HookTWO 160 and HookTHREE 170 scripts if they are found damaged, for example and without limitation by checking the MD5 value and SHA256 value of the files.

HookONE 150, HookTWO 160 and HookTHREE 170 may be given three different application names, thus making it hard for a User to identify if they are related to a single application in the system.

If the three sensors are implemented in Linux, unlike windows the file extensions do not matter since the manifest files and/or the first sentences in the header of the files described how to execute this file.

In certain embodiments, all of the above feature may make the three sensors completely un-removable once installed. Once installed on a device, the only way to remove the Linux/Sensor would be to run the UnInstall script.

In certain embodiments, it is the combination of the three sensors that makes the sensors unremovable. An uninstall application may look for a file via a hardcoded path and that file may need to contain an encrypted message generated using an RSA private and public key. In certain embodiments, if the key matches that is the only way all of the three sensors will know not to repair other sensors as they are authorized to be deleted from this device.

In certain embodiments, the first sensor 150 may audit and inspect all aspect of the device, machine or server. The first sensor 150 may collect all data and transform it using TCP protocol such as https type with a smallest payload data sharing format such as JSON and may beam this encrypted payload to the cloud, where the AI and Data analysts' software will further process it.

Figure 2:
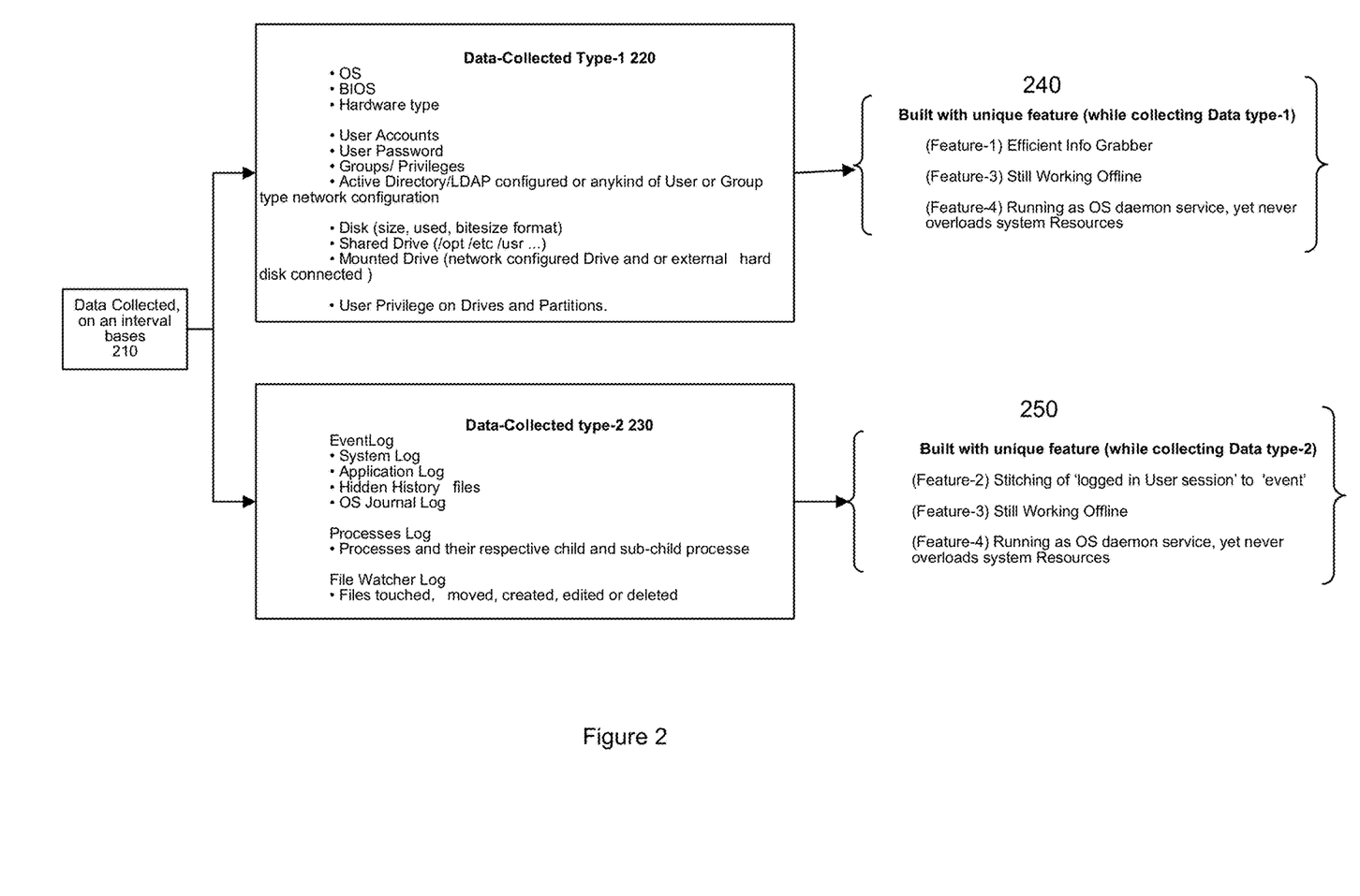
FIG. 2 depicts data collection methods and systems in accordance with certain embodiments.

In certain embodiments as shown in FIG. 2, the sensor application may include the three sensors described above and may perform one or more of the below functions. As discussed above, data 210 may be collected on a periodic interval. Collected data may be type 1 220 or type 2 230. Type 1 data 220 may include without limitation OS, BIOS, Hardware type, user accounts, user password, Groups/Privileges, Active Directory/LDAP configured or any kind of User or Group type network configuration, Disk (size, used, bitesize format), Shared Drive (/opt/etc/usr . . . ), Mounted Drive (network configured Drive and or external hard disk connected), and User Privileges on Drives and Partitions. Type 2 data 230 may include without limitation, one or more event logs, system logs, application logs, hidden history files, OS journal logs, process logs (including without limitation processes and their respective child and sub-child processes), and file watcher logs (including without limitation files touched, moved, created, edited or deleted). In certain embodiments, features 1, 3 and 4 described below may be performed 240 at least in part using Type 1 data 220 and Features 2, 3 and 4 may be performed 250 at least in part using Type 2 data 250.

(Feature-1) Efficient Info Grabber

In certain embodiments, a smart and efficient grabber may be provided that finds the best approach in terms of collection of data. In certain embodiments, the controller decided which approach to take has complete and sent a JSON payload, in as few command line queries, if possible. In certain embodiments, if a Controller finds a JSON attribute is missing values or answers, the Controller logic may provide a decision Guide, to collect any missing information, which may use the following approach to intelligently and efficiently collect the desired information:

Approach one may use user kernel command lines to grab multiple attributes in one pass. For example, while searching for 7 attributes, then the first command line should at least fetch 3 to 5 of those values to fill in and the rest of the attributes may come from the second command line and so on. This approach may use negligible programming (which may include java, C++, GO) heap, static and stack memory to query OS properties and attributes.

In approach two, if all command lines fail due to limited privilege or missing kernel API because a lighter version of the Linux OS is installed, the file may be queried based on the factory default path location and scrape the information out of the file. In certain embodiments, for very large files only one line at a time maybe loaded into Application memory and after each line the system may check if the information is retrieved and, if overall information is retrieved, then the file may not be read any further.

In approach three, the factory default system file may be used to lookup the required information and then the system config file will be traverse. In certain Linux and Unix embodiments, the system config file may be found under the root/etc folder initially by doing a full scan on the folder.

| Example |
|---------|
| fetch Ethernet-0 address of the LAN Network card driver |
|     found eth0, ERROR := front-executing-Approach-1-method( ) |
|     if (No ERROR) && (found_eth0 matched Hexideicimal type separated by colons) { |
|       return found_eth0 |
|     } |
|     found eth0, ERROR := front-executing-Approach-2-method( ) |
|     if (No ERROR) && (found_eth0 matched Hexideicimal type separated by colons) { |
|       return found_eth0 |
|     } |

| Example |
| --- |
| found_eth0 := from-executing-Approach-3-method( )<br>return found_eth0 | note: when the word "Identify & conform" is used the (found_eth0 matched Hexdeicimal type separated by colons) is also checked In certain embodiments, a System Admin can Manually configure Operating systems during initially install of the OS. also referred to as a Custom Install and also may move the file or partially install some of OS command line feature.

In certain embodiments, approaches one, two and three may be selectively applied as part of a decision guide that may also be referred to as an Inspect Controller, that uses the quantity of attributes filled or found as a heuristic value for game solving and reaching a desired goal in fewer steps or moves to complete the form which is information needed before uploading data.

In certain embodiments, the decision guide or inspect controller may decide when all the required information is of valid formation and complete, with no missing answers; then and only then it will send data.

In certain embodiments, the processes to identify and grab the information are optimized to perform in the easiest & quickest way possible depending on the how intensively the System Admin (during the installation) might have deviated from the operating system factory default settings.

In certain embodiments, the underlying algorithm may be designed to find data quickly, by requiring minimum crawling (scape) through the system files and using the best kernel command line to fetch the information; and using minimalistic Heap and Stack Memory while running a program written in C++, Java, and/or Perl or other suitable programming language such as: GoLang, Python or Tcl. In certain embodiments, the sensors may be implemented as software and may minimize use of resources, CPU and memory. In certain embodiments, the ultimate goal may be grabbing the correct information/data and not accepting NIL or NA or blank strings(answer) to the desired attributes sought by the decision guide.

In certain embodiments, the first sensor is not at all CPU and RAM (cache memory) intensive and may work under the configuration of a system Daemon configuration and may use only one CPU and under 40% of the CPU processing power. Daemon processes are threads that may wait and yield until CPU finishes heavy tasks and CPU usage drops below 40% of overall usage.

If the first two approaches above fail, the desired data may still be collected by navigating the parent file and its child and grandchild files until the type of information needed by the first sensor is confirmed to complete its inspecting and query on the device.

The first sensor 150 may be built for all Linux distribution types under the Linux family, such as without limitation: "fedora", "Debian", "IBM Linux" and "HP-Linux" and may be applicable to the second and third variation.

The second variation of the sensor may be applicable, including without limitation to Unix type OS, such as: "HP-UX", "IBM-AIX", "Sun-Solaris", "UnixWare" and "OpenServer"

The third variation of the sensor may be applicable to object-based operating system, including without limitation systems such as IBM i5/OS or AS/400

Most operating systems on Devices/Servers may be configured to conceal/hide information from ordinary eyes, especially when they are hosted with reachable IP's in company's intranet or internet domain. Organizational/Enterprise System Admins can go through extensive configuration to manipulate system setup, i.e., to remove (and/or update) tools, package, files to make it difficult to find system configuration information, within the device itself.

In certain embodiments, the Sensor application may still collect all such information from a Linux or Unix device by reading its /etc/ . . . /<systemapp>.conf file (applying the top-to-bottom approach) and may start from the system *.conf file, (wherever they may be). These may be the same conf files that the OS refers to for kernel application on startup. Once the conf file are found, they later may be scanned to find other reference files for detailed setup and properties. In certain embodiments, the Sensor may start to dive in, given the worst-case scenario of highly configured and secured devices. The Sensor also may handle all soft links files when and if necessary.

(Feature-2) Stitching of 'Logged in User Session' to 'Event'

Sources to Stitch Data:

In certain embodiments, information may be stitched from one or more of the following sources:
  (a) Event logs from running application (which may be collected by default in Linux or Unix) which may include without limitation user ID, username, or Group name and Group ID with application events
  (b) Output of ksh/csh type commands for example and without limitation "who am I", "who" and "last-<flags>"
  (c) Any file ending with the word "history" (most likely found in hidden files section) example: ".bash_history" or ".history" under each /home/${user} folder
  (d) System logs (also known as syslog's), journal logs and other events logs.
  (e) /proc file, that maintain a list of running applications and child applications
  (f) "Audit" application logs (which may be pre-installed as part of OS installation) may be used even though they may generate duplicate events with a first captured by other logs and a second captured by an audit tool including both current and archived logs.

In certain embodiments, the system may triple confirm and affirm User, UserID and Group ID at each line of the event logs to make it easy to find anomalies. For example, if an event log is marked with a different UI and user history provided a different User and User ID or the "who" and "last" command provides a user session timeframe then this may indicate some kind of anomaly.

All Events may be stitched to a User-Account, Login-Session and Source (User IP) address, by grabbing information from a different source of the operating system, for example, given a scenario where 3 different remote users are logged into a Server using RDP (Remote Desktop) or SSH.

The first sensor may be capable of tracking each user, even though one or many of them may have been logged in remotely at the same time, by keeping track (auditing) of each IP address and /home/$User folder. (which is usually stored as a hidden file in the home directory of each user example /home/dave/.xxxxhistory) and scrape actions and commands executed, under that user profiles.

In certain embodiments, under a Heavy CPU load, a first sensor may enable this history bash files store which is a feature of the OS and User Policy for each user on Install, if found NOT configured in the OS and can always refer this as part of the stitching event to user.

In certain embodiments, stitching an event to a user may literally mean stitching files from different sources, which have been collecting tiny bits of application audit data and stitching them to a user login session, which comes from a different file. Other audit applications may or may not store which UID (user ID) may trigger the process or event. In certain embodiments, stitching and composing all the files into one may further include adding a separate marker or flag but with a name of the UserID, name and IP address or what fields have been collected so far.

The Stitch may expand to identify the parent processes and track all the child processes associated with those actions. The Sensor also may take the OS self-maintained journal entries and send the data to the cloud in bulk.

In certain embodiments, Local Account Information, (i.e. User profiles configured on the device) along with the approaches to Authenticate and Authorize the User to login to the system may be collected including but not limited to:
  a) Accounts (Users and Groups) create on the Operating System.
  b) LDAP, Active Directory or any Network Service account type User Accounts that are associated with a Group to login to the system.
  c) This part type of Authentication and Authorization All User Accounts may be reported with the following information
  1. Password configuration attributes such as last time changed, when to expire next, and is the account locked
  2. When did the User Account Last Logic and How (using remote VPN, RDP or SSH)
  3. All Accounts that have the privilege as Root (Sudo or su) and how, (with or without Password needed if logged in using this user local account).
  4. Accounts configured via Network (remote central repository of all the people in the organization) and how it was configured: i.e. via LDAP or ActiveDirectory.

In certain embodiments, the above information may be stored in files like /etc/passwd and /etc/group and may use other OS command line such as "last" "whoami" or "who am i" to grab it or read it for file /etc/wtcp (Feature-3) Still Working Offline In certain embodiments, the sensor may lose a pulse (connection to the internet) but may never fail to send the full report.

In certain embodiments, it is not desired to store event logs on a client device/server. In certain embodiments, where all devices are connected to the internet, the last 20 minutes of activities may be transmitted for processing.

While other Audit sensors may send data at a certain interval, based on the availability of a WIFI or LAN connection and will NOT store the Audit data on the system, in certain embodiments, methods and systems may detect if a Wi-Fi and LAN connection is pre-established and if NOT may save collected and compiled information on the system as one or more hidden files, with a replication factor of two (2). i.e. each File may be stored at different physical paths.

The sensor may keep composing (collecting all and event logs and stitching), even when offline and may transmit all the info once internet access via WIFI or LAN or other means is re-established.

In certain embodiments, checking the internet may only happen around the next daemon configured interval of admin application event data to run.

If the data collected is too large (or spans multiple days) then https payload max capacity may become a factor. In certain embodiments, the sensor may start to slice collected logs into payloads of 35 to 40 MB maximum and may start sending data via TCP Client.

While flushing all the historic collected data, composed events may be stored in a hidden file, which may use two gates: one gate may beam the historic data from the hidden file, while the other may send the last 20 min of the event captured. An https request may be made to the same endpoint, i.e. the Dans Log collector that captures this type of JSON formatted data.

While other Audit Sensors may send data at a certain interval based on the availability of an Internet connection and may not store the Audit data on the system, certain embodiments may detect if an Internet connection is pre-established, and if NOT may save collected and compiled information on the system as a hidden file, with a replication factor or two (2) in a file stored in two different paths. The Sensor may keep composing (stitching) & collecting each and every event, even when offline and may release all the info once an Internet connection is established, around the next interval. If the data collected is too large or spans multiple days, then https payload max capacity may become an issue, for example payload data may be beamed to the Analytics in chunks of 30 MB. While flushing all the historic collected composed events, transmission may be sped up, by opening two "gates." In certain embodiments, Gate 1 may send historic data and Gate 2 may send data of the events collected in the past 20 min. Gate 1 may be closed when transmission catches up and all historic data has been transmitted to a log collector ingestor.

The use of the second gate may permit maintaining a CPU under capacity while restoring the collector to a normal mode where only the preceding 20 to 30-minute interval remains to be transmitted.

A pulse may refer to the interval in which data is uploaded to the Cloud for report and analysis.

If for some reason the data was not accepted by the HTTPS Listener/receiver, then the Sensor may store that information (https payload data) until the next interval in a temporary file, (without using the RAM cache memory) and may send the previous data along with the newly collected data.

(Feature-4) Running as OS Daemon Service, Yet Never Overloads System Resources

In certain embodiments, the sensor may have a prebuilt check before borrowing hardware resources such as CPU or Memory and only then it may compute when the CPU Cycle may be given priority to a Daemon application. Other software Audit tools may simply wait for their CPU cycle (timeslice Interval) configured as a daemon service and may run the application when the CPU cycle prioritizes the application, which may result in an overloaded or heated CPU.

In certain embodiments, a Sensor may be configured just like other audit tools as a daemon to run, but the sensor may go one step further and check if the Host/server is under heavy load i.e. over 70% of its CPU and memory usage and if so may delay its computation, which may include delaying composing json and transmitting it to an Ingestor (log collector). For example, a Banking Server on a payday would be under tremendous counts of processes running, transactions, thus, spiking the CPU and memory use.

In certain embodiments, the Sensor when configured as a daemon service will check CPU and Memory before starting using any system response to process info. While other parties will simply configure an Audit tool as a daemon service and let the kernel decide how to use this resource, the sensor of the present invention may check again before taking over some resources to perform processes.

In certain embodiments, the Sensor may collect all logs under during its collection interval, but will store it as temporary files until CPU Monitoring indicates below average CPU usage, and after waiting for it to be stable at that CPU and memory resources usage, the Sensor may start beaming data more frequently. By increasing the frequency at which the sensor updates the Cloud, it may transmit the unsent data until all the Past Data has been Uploaded or the CPU and Memory Usage starts to increase above 50% of its total capacity.

Monitored Events may include, without limitation:
a) All Applications Running at any given time.
b) OS journal entries.
b) Any Event that occurred at all levels of the kernel and was stored or recorded as part of OS Kernel Journal.
c) Files created, Destroyed, Moved, Deleted on any Shared Drive or external hard disk mount.
d) Stitching of Events with Logged In User Session and IP when IP is 0.0.0.0 or not present which means the User is physically logged into the device during that User Session Window and if not, the remote IP will appear. The identifying Event and Sub Processes that were Initiated as part of the User Action.

(Feature-5) Retrieving Events Back in Time (by Hours and Minutes) to Reconstrue Event Logs.

Normally, if an audit application is stopped or deleted, it loses track of when it was last auditing and will start auditing once it is re-started, but not all of them compensate for the lost time in between.

As described above, if a Sensor was disrupted by killing the main process and/or stopping the service or even a user going as far as deleting the executable itself, the first sensor may go back in time and reconstrue the event-logs from where it left off.

In certain embodiments, a Sensor may re-produce code, either by downloading it or code reproducing code by unzipping a hidden file stored as backup for another application, as described.

In certain embodiments, the restart command-line from applications HookTwo 160 and HookThree 170 to start HookOne 150 may contain a command file string flag of HH:MM that indicates how far back in time the Main Application: HookOne 150 is supposed to reach before it starts re-stitching the first event-log after start.

In this process, HookOne 150 may detect an archived log file user /var/log/ (for Linux) and /var (for Unix) that are zipped and may temporary unzip them in OS System /tmp location for reading purposes.

In certain embodiments, the first sensor 150 may be able to go back by a maximum interval, which may for example and without limitation be a maximum of 24 hrs and may read old zip files. In certain embodiments, an exception may exist if the archived file were completely removed under the /var/log (Linux) or /var (Unix) folder that may only reach up to where the Archive file report begins.

Function's (Features) of the First Sensor

In certain embodiments, each of the below functions and feature below may send data to its individual URL endpoint.
Attribute (Data Payload) of the Smallest Burst
Collect and report all the information that Uniquely Identified this system. (i.e. two systems cannot have the same Mac Address and System Hardware serial number)
1. Bios Version
2. Hardware Version
3. Manufacture details.
3. LAN Ethernet Card ID Number
4. IP Address of the System
4. OS version
5. System Time Zone.

The above compose the smallest yet unique information needed to differentiate between two very similar machines. (example Dell, with same OS version given to a company)
Ingest Application In certain embodiments, an Ingest application may act as the intermediary between the data collection and data analysis portions of the platform. The Ingest application may handle incoming event data generated by Collector and Sensor applications. It may be responsible for the secure receipt of event data (utilizing TLS encryption over HTTP), basic validation and pre-processing (tagging), and insertion into a bulk processing queue for parsing and analysis. The application may be cloud-based and may utilize an auto-scaling server infrastructure in order to maximize performance and cost efficiency.

Figure 3:
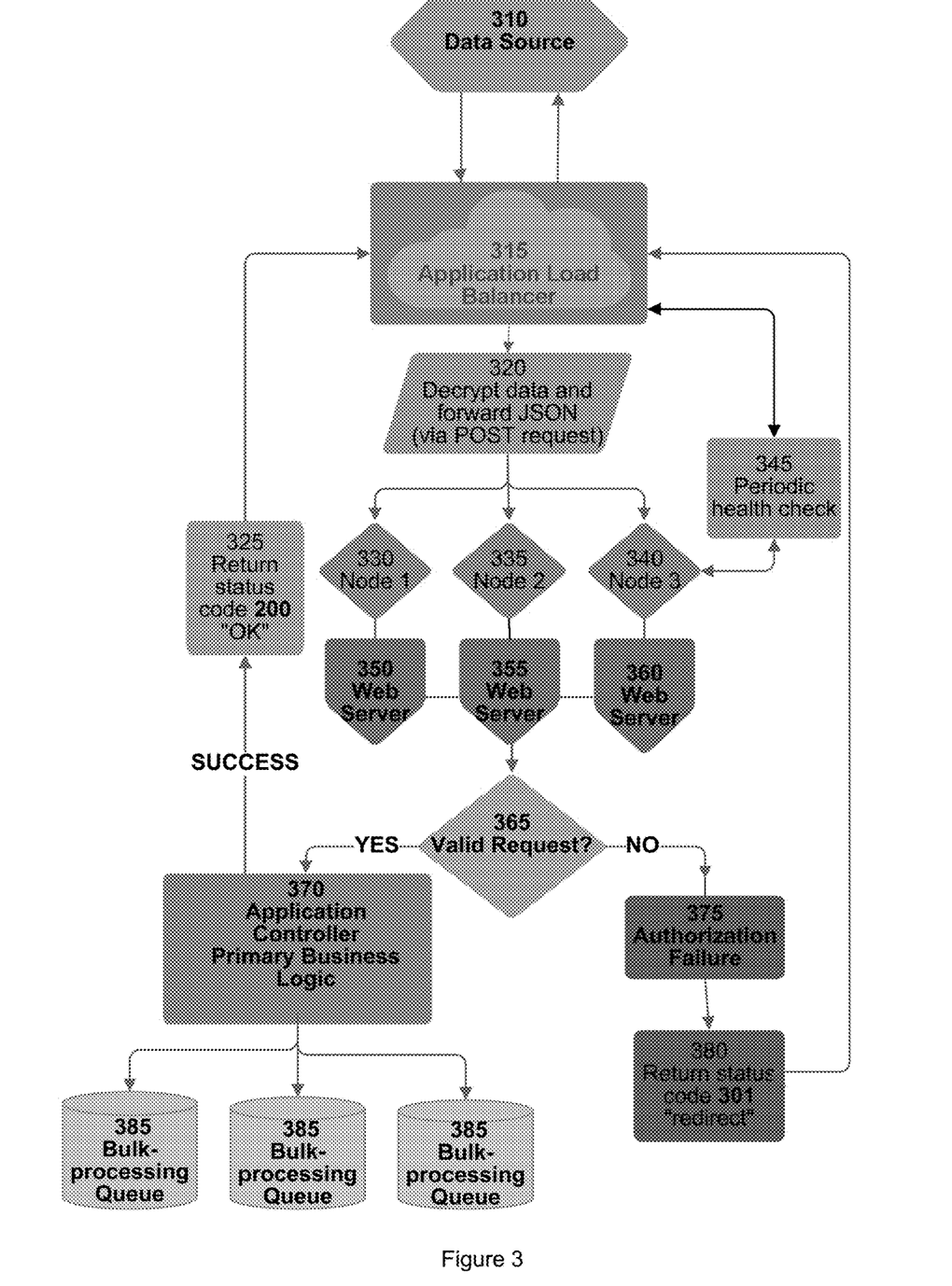
FIG. 3 depicts a data ingest system and method in accordance with certain embodiments.

In certain embodiments as shown in FIG. 3, the ingest application may include the following components:
1. Application load balancer
2. Web server
3. Application server
4. Ingest application code The application load balancer 315 may serve as the single point of contact for clients. A listener may check for HTTP POST requests from clients on TCP port 443 and may decrypt a TLS transmission and evenly distribute the incoming event across one or more virtual server instances (which may be referred to as application nodes). The load balancer 315 automatically may scale depending on the volume of traffic that is being received. Every 5 minutes, the load balancer may perform a 'health check' on all running application nodes. If a specified resource threshold is breached (which may indicate greater than 90% CPU utilization or less than 75% CPU utilization), application nodes may be added or removed in order to maximize application availability and cost efficiency.

Web Server (Running on Application Node)

The web server may provide basic HTTP transaction handling. The web server may act as a reverse proxy, handling all incoming HTTP requests forwarded by the load balancer and sending them to the application server.

Application Server (Running on Application Node)

At its core, the application server may be a process manager and HTTP request router. It may be tightly integrated with the web server and may act as the intermediary between the web server and application code. The application server may run a pool of workers, which are individual instances of the application code loaded into memory. The application server may handle the task of evenly distributing incoming requests amongst running worker processes.

Ingest application code (running on application node) The Ingest application code may be broken into four distinct parts:

Identification—What Type of Event was Received

Incoming events may be identified based on several criteria, including the endpoint at which they were received (e.g., /firewall, /linux logs, /core banking) and event parameters (params); events may be sent to a specific application controller based on the event type Validation—Did the Event Come from an Authorized Client Incoming events may utilize the HTTP header for authentication; the HTTP header of each event may be validated by the application controller against a pre-set authentication key; authentication failures may result in a 301 HTTP status code response being sent to the client, redirecting them away from the app Processing & Tagging—Encoding the Data and Adding Identifiers The event may be compressed using the Zstandard compression library and may be converted to binary using Base64 encoding; a unique identifier may be randomly generated; a new JSON object may be created, consisting of the encoded event, the randomly generated identifier and the event type identifier Queue Insertion—Adding the Event to a Bulk Processing Queue The JSON object containing the pre-processed event may be inserted into a bulk processing queue 386; the application controller may determine which queue the data gets inserted into based on the event type identifier; after the data is successfully inserted, a 200 HTTP status code response may be sent to the client In certain embodiments as shown in FIG. 3, encrypted data from the sensor 310 may be sent over the internet via the HTTP protocol to the application load balancer 315. The application load balancer 315 may decrypt the data 320 and send it to an available application node 330, 335 or 340 inside of a virtual private cloud. One or more web servers 350, 355 and 360 may run on one or more application nodes 330, 335 and 340 may receive the decrypted data, and forward it to an application server, which may be where the ingest application code resides. The ingest application may receive the event from the web server 350, 355 or 360, attempt to identify what type of event was received and forward the event to the appropriate application controller if a valid request 365 is detected. If a request is not valid, an authorization failure 375 may be generated and a status code of 301 "redirect" may be generated 380 and sent to load application load balancer 315. The application controller 370 may validate that the event came from an authorized client and may compress and encode the event data. The application controller 370 may generate 325 and return a status code 200 "OK" to application load balancer 315. The application controller may then send the encoded event into one or more bulk insertion queues 385. The application load balancer may perform periodic health checks 345 of the individual application nodes on a 5-minute interval. If the resource utilization on the application nodes rises or falls above or beneath certain pre-defined thresholds, the application load balancer 315 may add or remove application node servers in order to maximize resource utilization and reduce costs.

The application may be designed to run on an auto-scaling, multi-node fleet of Linux-based virtual servers. Servers running the application may be automatically added or removed by an application load balancer 315 in order to meet the volume of incoming data and maximize cost efficiency.

The Ingest application may be the intermediary between the data collection and data analysis portions of the platform. The Ingest application may be used to securely receive incoming event and log data, verify the validity of the data, do initial pre-processing/tagging, and to insert the tagged data into a bulk queue for processing and analysis. The Ingest application may be the central receiver for incoming events generated by a variety of software clients and data sources.

Certain embodiments may ingest streaming log data from any device to simultaneously update a model and use that model to detect anomalies in the data stream in real-time. It may do this by leveraging a novel data engineering architecture and applying a succession of complementary models to the incoming data. A score may be composed from the models to generate an anomaly metric. Certain embodiments may detect messages that contain atypical information that may indicate breakages, downtime, or malicious activity on a device (where device may be a firewall, VPN endpoint, security endpoint, or any other equipment that transmits high frequency logs). These detections then may be transmitted to a user interface and other communication means (which may include without limitation email or phone).

Figure 4:
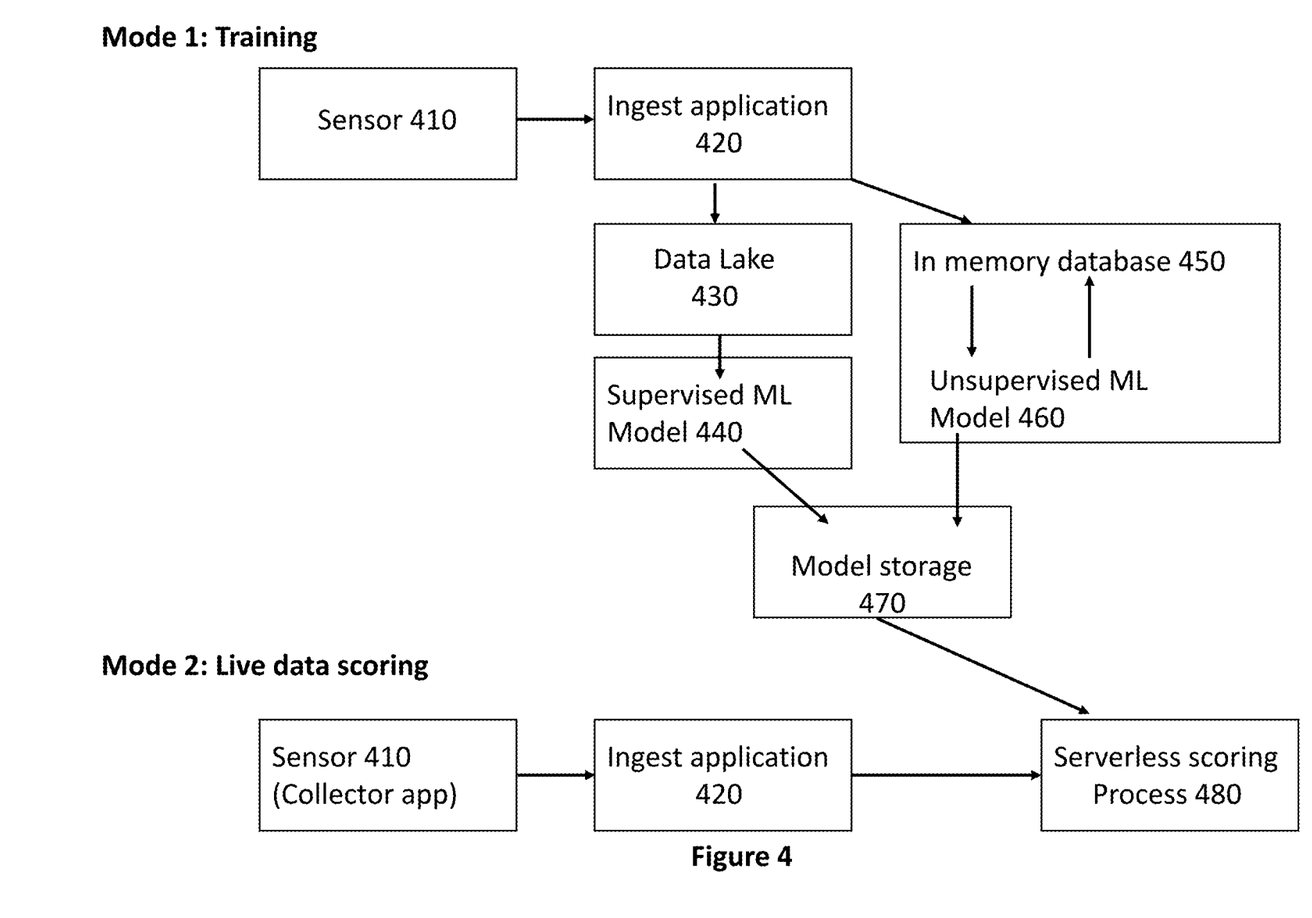
FIG. 4 depicts anomaly model development and data scoring modes in accordance with certain embodiments.

In certain embodiments as shown in FIG. 4, the data ingestion may occur in two simultaneous modes. In certain embodiments, a training mode (Mode 1) may receive data from sensor 410 installed on a host and transmit the data to ingest application 420. From the reception of this data, the data can take two routes—storage in a data lake 430 or to an in-memory database 450 for directly training an unsupervised machine learning model 460. Using the data at rest in the data lake 430, additional supervised machine learning models 440 may be trained. Both routes lead to generation of models and storage of models in a database 470. These routes are discussed in more detail below.

The live data scoring mode (Mode 2) takes data from the ingest application 420 to a serverless scoring process 480. In this embodiment, live data and stored models from model storage 470 may be used to score the incoming data and grade the data on whether it should be alerted on to the end user.

The data engineering and machine learning components may work as follows: Model training may be broken into two branches—semi-supervised and unsupervised learning. Unsupervised Learning:

a. Data Engineering: Data may come into a data queue and be picked off of the queue by an ongoing server process. The same server also may be running an in-memory database. As data comes off the queue, the following processes may take place:
 1. Training (which may occur over 1-3 hours of live data streaming):
    a. the database may be queried for the corresponding stored model
    b. the stored model may be updated using the incoming data
    c. the updated model may put back into the in-memory database.
 2. Testing (which may occur over 1-3 hours of live data streaming):
    a. The resulting model may be used to test incoming data to create a distribution of scores, which also may be stored in the database 3. Live scoring:
   a. a threshold may be defined based on the resulting scores
   b. Both threshold and model may be pushed to a low latency database (e.g., DynamoDB) to find anomalies in streaming data
   b. Model Building:

Log data has many static parts (messages, alerts) and many moving parts (timestamps, ips, etc). Certain embodiments may template the log data to classify the logs into different event types. As more logs run through a templating process, the templates may become more numerous and also more general, accounting for a large variety of event types seen in the logs. This log templating may be accomplished by a fixed depth tree-based algorithm.

After these templates are defined, they may be broken down into their composite n-grams (words or tokens), and incoming data may be matched on these templates in two ways—regular expression matching and token similarity. If a template is matched using regular expression, it may be given a score based on the frequency of the template. If it is not, then the score may be given based on the token similarity to the most similar template added to the frequency of that template. With live data, if a score exceeds the threshold that has been stored for a given model, an alert may be issued.

Supervised Learning:
   a. Data Engineering:
   Data may be ingested and stored in a data lake 430.
   b. Model Building:
   Using data flagged on by the first model, the anomalously flagged data may be manually tagged by what looks malicious in a cybersecurity expert's opinion. Using this information, certain embodiments may build a small data set of malicious and normal traffic that can be trained on using a weak word sense-based classifier, which may then be more broadly used on the rest of the incoming data.

Currently available solutions are much harder to use than the present invention. Certain embodiments utilize a collection technique that will immediately start analyzing data with little to no configuration necessary. As soon as data is received to certain embodiments of the system, a model may begin to build, which then may be useable for scoring in less than 6 hours.

Certain embodiments are not dependent on a data lake 430—typical solutions will require extensive log collection in some type of storage to facilitate model training. Certain embodiments allow models to be trained on live data, which may reduce the resources necessary to support the analytics. A data lake may be used to create an optional, complementary model for scoring.

Certain embodiments also may have a focus on individual log events—typical log-based anomaly detection techniques look at chunks of logs broken into sessions (aka periods of usage) or log sequences and try to analyze how anomalous a given sequence is. For certain types of attacks, like distributed denial-of-service (DDOS), analyzing multiple logs at a time can be a useful vantage. However, subtler characteristics of individual logs can indicate important anomalies. In certain embodiments, machine learning techniques allows us to look at individual logs, while reducing over notification and false positives through our sequence of complementary models.

Certain embodiments are platform agnostic, since they may be cloud based deployment.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. An anomaly detection device for core banking systems, comprising:
   a first sensor program for detecting anomalous behavior on a core banking system;
   a second sensor program for verifying that the first sensor remains active;
   a third sensor program for detecting removal or corruption of the first sensor or the second sensor; and
   wherein each of the first sensor, the second sensor and the third sensor are configured to detect removal or corruption of either of the other two sensors at a periodic interval and to repair any of the other two sensors that has been corrupted or to reinstall any of the other sensors that have been removed;
wherein the first sensor is configured to detect anomalous behavior by:
   collecting identifying information and first live data;
   generating a first live data template from the first live data;
   transmitting the first live data template to a data engineering engine configured to apply an anomaly detection model developed using live data to first live data collected by the first sensor;
   wherein the anomaly detection model is configured to:
      compare the first live data template to a plurality of existing anomaly detection models; and
      if an existing anomaly detection model is applicable to the first live data template,
         update the existing model to incorporate the first live data template; or
      if an existing anomaly detection model is not applicable to the first live data template,
         generate a new anomaly detection model of a first event in the first live data template;
         train the new anomaly detection model to recognize the first event in the first live data template;
         test the new anomaly detection model against second live data; and
         generate a live score of the first live data template to indicate the likelihood that the first event is an anomaly;
      storing the new model with the plurality of existing models;
   receiving the first live score at the first sensor.

2. The anomaly detection device of claim 1, wherein
if the first live data template does not match any of the existing anomaly detection models,
   the anomaly detection module is further configured to:
      remove at least one rapidly changing field from the first live data template to generate a set of tokens; and
      compare the set of tokens to the existing anomaly detection models; and
         if the set of tokens matches an existing anomaly detection model,
            generate a live score of the first live data to indicate the likelihood that the first event is an anomaly.

3. The anomaly detection device of claim 1, wherein the anomaly detection model applies time differential analysis to determine which of the first live data to compare to the existing anomaly detection models.

4. The anomaly detection device of claim 1, wherein the time differential analysis is performed by monitoring one or more event logs, process logs and file watcher logs for change over a monitored interval to identify one or more changed logs and comparing the changed logs to the existing anomaly detection models.

5. The anomaly detection device of claim 4, wherein the one or more changed logs have changed in at least one of a size of a file, a number of lines of a file or a byte count of a file snapshot over the monitored interval.

6. The anomaly detection device of claim 1, wherein the live score comprises:
   a first live score based on the frequency that the first event occurred during testing of the new anomaly detection model; and
   a second live score based on an assessment of token similarity between the first live event and the existing anomaly detection model or the new anomaly detection model;
   wherein the live score comprises a probability that the first event is anomalous based on the first live score and the second live score.

7. The anomaly detection device of claim 1, wherein the first live data comprises a first moving live data and a first static live data; and
   wherein the live score is generated by comparing the first static live data to an event template in the existing anomaly detection model or the new anomaly detection model.

8. The anomaly detection device of claim 1, wherein the first live data is collected via a decision guide that comprises one or more data collection methods starting with a least resource intensive collection method and if the first live data needed by the anomaly detection model is not obtained by the least resource intensive collection method, directs the performance of progressively more resource intensive collection methods until the first live data needed by the anomaly detection model is collected.

9. The anomaly detection device of claim 1, wherein the first live data is collected via one or more kernel command to minimize use of the first sensor on the core banking system.

10. The anomaly detection device of claim 1, wherein the first live data is collected via a decision guide using one or more of the following three steps:
    executing one or more kernel command to minimize use of the first sensor on the core banking system; and
    if the one or more kernel command does not return a desired data set:
    collected the first live data by querying a factory default path for the desired data set or by traversing a system configuration file used by the core banking system on start up of one or more apps at each run level of the kernel.

11. The anomaly detection device of claim 1, wherein the first live data comprises stitched together data from a plurality of log categories comprising event logs, process logs and watcher logs based on a timestamp.

12. The anomaly detection device of claim 11, wherein the stitched together data comprises event data wherein the user data is labeled as third party data.

13. The anomaly detection device of claim 11, wherein the stitched together data is produced by revalidating a UserID and an IP address outside of a system capture log.

14. An anomaly detection system for core banking systems, comprising:
    a data engineering engine configured for
       receiving live data from an endpoint anomaly detection system comprising;
          a first sensor program for detecting anomalous behavior on a core banking system;
          a second sensor program for verifying that the first sensor remains active;
          a third sensor program for detecting removal or corruption of the first sensor or the second sensor; and
          wherein each of the first sensor, the second sensor and the third sensor are configured to detect removal or corruption of either of the other two sensors at a periodic interval and to repair any of the other two sensors that has been corrupted or to reinstall any of the other sensors that have been removed;
       applying an anomaly detection model developed using live data to first live data collected by the first sensor;
    wherein the anomaly detection model is configured to:
       comparing the first live data to a plurality of existing anomaly detection models; and
       if an existing anomaly detection model is applicable to the first live data,
          updating the existing model to incorporate the first live data; or
       if an existing anomaly detection model is not applicable to the first live data,
          generating a new anomaly detection model of a first event in the first live data;
          training the new anomaly detection model to recognize the first event in the first data;
          testing the new anomaly detection model against second live data; and
       generating a live score of the first live data to indicate the likelihood that the first event is an anomaly;
       storing the new model with the plurality of existing models.

15. The anomaly detection system of claim 14, wherein the live score comprises:
    a first live score based on the frequency that the first event occurred during testing of the new anomaly detection model; and
    a second live score based on an assessment of token similarity between the first live event and the existing anomaly detection model or the new anomaly detection model;
    wherein the live score comprises a probability that the first event is anomalous based on the first live score and the second live score.

16. The anomaly detection system of claim 14, wherein the first live data comprises a first moving live data and a first static live data; and
    wherein the live score is generated by comparing the first static live data to an event template in the existing anomaly detection model or the new anomaly detection model.

17. The anomaly detection system of claim 14, wherein the first live data is collected via one or more kernel command to minimize use of a system memory on the core banking system.

18. The anomaly detection system of claim 14, wherein the first live data is collected via a decision guide using one or more of the following three steps:

executing one or more kernel command to minimize use of the first sensor on the core banking system; and
if the one or more kernel command does not return a desired data set:
collected the first live data by querying a factory default path for the desired data set or by traversing a configuration file for the desired data set.

19. The anomaly detection system of claim 14, wherein the first live data comprises stitched together data from a kernel journal and one or more additional markers from an app auditor.

20. The anomaly detection system of claim 19, wherein the stitched together data comprises event data wherein the user data is labeled as third party data.

21. The anomaly detection system of claim 19, wherein the stitched together data is produced by revalidating a UserID and an IP address outside of a system capture log.

22. An anomaly detection method for core banking systems, comprising:
receiving live data from an endpoint anomaly detection system comprising;
a first sensor program for detecting anomalous behavior on a core banking system;
a second sensor program for verifying that the first sensor remains active;
a third sensor program for detecting removal or corruption of the first sensor or the second sensor; and
wherein each of the first sensor, the second sensor and the third sensor are configured to detect removal or corruption of either of the other two sensors at a periodic interval and to repair any of the other two sensors that has been corrupted or to reinstall any of the other sensors that have been removed;
applying an anomaly detection model developed using first live data collected by the first sensor;
comparing the first live data to a plurality of existing anomaly detection models; and
if an existing anomaly detection model is applicable to the first live data,
updating the existing model to incorporate the first live data; or
if an existing anomaly detection model is not applicable to the first live data,
generating a new anomaly detection model of a first event in the first live data;
training the new anomaly detection model to recognize the first event in the first data;
testing the new anomaly detection model against second live data; and
generating a live score of the first live data to indicate the likelihood that the first event is an anomaly;
storing the new model with the plurality of existing models.

23. The anomaly detection method of claim 22, wherein the live score comprises:
a first live score based on the frequency that the first event occurred during testing of the new anomaly detection model; and
a second live score based on an assessment of token similarity between the first live event and the existing anomaly detection model or the new anomaly detection model;
wherein the live score comprises a probability that the first event is anomalous based on the first live score and the second live score.

24. The anomaly detection method of claim 22, wherein the first live data comprises a first moving live data and a first static live data; and
wherein the live score is generated by comparing the first static live data to an event template in the existing anomaly detection model or the new anomaly detection model.

25. The anomaly detection method of claim 22, wherein the first live data is collected via one or more kernel command to minimize use of a system memory on the core banking system.

26. The anomaly detection method of claim 22, wherein the first live data is collected via a decision guide using one or more of the following three steps:
executing one or more kernel command to minimize use of the first sensor on the core banking system; and
if the one or more kernel command does not return a desired data set:
collected the first live data by querying a factory default path for the desired data set or by traversing a configuration file for the desired data set.

27. The anomaly detection method of claim 22, wherein the first live data comprises stitched together data from a kernel journal and one or more additional markers from an app auditor.

28. The anomaly detection method of claim 27, wherein the stitched together data comprises event data wherein the user data is labeled as third party data.

29. The anomaly detection method of claim 27, wherein the stitched together data is produced by revalidating a UserID and an IP address outside of a system capture log.

* * * * *